United States Patent [19]
Kaplan et al.

[11] 3,984,835
[45] Oct. 5, 1976

[54] HOMODYNE COMMUNICATION SYSTEM

[75] Inventors: Gerald Stanley Kaplan, Trenton; Andrew David Ritzie, Delran, both of N.J.

[73] Assignee: RCA Corporation, New York, N.Y.

[22] Filed: May 12, 1975

[21] Appl. No.: 576,604

[30] Foreign Application Priority Data
May 8, 1975 United Kingdom............... 24404/75
May 8, 1975 United Kingdom............... 24405/75

[52] U.S. Cl............................ 343/6.5 SS; 343/6 A; 343/6.8 LC
[51] Int. Cl.².......................................... G01S 9/56
[58] Field of Search............ 343/6 A, 6.5 R, 6.5 LC, 343/6.5 SS

[56] References Cited
UNITED STATES PATENTS
3,798,641  3/1974   Preti.............................. 343/6.5 SS

OTHER PUBLICATIONS
A. R. Koelle et al.; Short–Range Radio Telemetry for Electronic Identification Using Modulated RF Backscatter; Proceedings of the IEEE; Aug. 1975.

Primary Examiner—T.H. Tubbesing
Attorney, Agent, or Firm—Edward J. Norton; Joseph D. Lazar; Michael A. Lechter

[57] ABSTRACT

A homodyne communication system comprising an interrogating unit and a plurality of responsive remote units wherein a continuous wave RF signal is transmitted from the interrogating unit to illuminate a remote unit. The remote unit causes a return (reply) signal to be transmitted or reflected back to the interrogating unit. A sample of the transmitted (interrogation) signal is mixed with the return signal. Amplitude nulls in the mixer output signal at given relative phase relationships between interrogation and reply signals, are substantially eliminated by selectively shifting the relative phase of the signals. Also disclosed are a homodyne communication system utilizing phase modulation to impress FSK signaling on the reply signal and an automatic vehicle location system utilizing the present invention.

17 Claims, 7 Drawing Figures

HOMODYNE COMMUNICATION SYSTEM

CROSS REFERENCE TO RELATED APPLICATIONS

Of interest are the following co-pending applications: Ser. No. 428,721 entitled "Electronic Identification System", filed Dec. 27, 1973 by R. J. Klensch (issued Oct. 21, 1975 as U.S. Pat. No. 3,914,762) and Ser. No. 473,765 entitled "An Electronic License Plate for Motor Vehicles", filed May 28, 1974 by F. Sterzer.

BACKGROUND OF THE INVENTION

1. Field of the Invention

The present invention relates to homodyne communication systems and in particular to homodyne vehicle location systems.

2. Description of the Prior Art

Communication systems utilizing interrogation units and responsive identification tags which provide a modulated return signal to the interrogating unit are described in copending applications Ser. No. 428,721, filed Dec. 27, 1973 by R. J. Klensch and Ser. No. 473,765, filed May 28, 1974 by F. Sterzer, cited above. Such systems however, utilize pulse (amplitude) modulation of the return signal and direct detection of the return signal modulation in the interrogating unit. Consequently, such systems are disadvantageous with respect to, for example, a homodyne system, in that direct detection is not as sensitive as a homodyne system at low power signal levels, and thus, requires higher power signal transmission levels of the interrogation signals. Moreover, direct detection is not compatible with phase modulation, which is advantageous with respect to amplitude modulation in that better signal to noise ratios may be achieved with phase modulation.

A homodyne system is defined in the art as a system wherein a sample of the transmitted signal is used as a local oscillator signal. Typically, in a homodyne system, an RF signal is transmitted from an interrogating unit to illuminate a compatible remote unit. The remote unit casues a signal to be transmitted or reflected back to the interrogating unit. A sample of the transmitted (interrogation) signal is applied, with the returned (reply) signal to a suitable phase detector or mixer. In general, the amplitude of the output signal of the mixer is equal to the product of the amplitudes of the sample of the transmitted signal (local oscillator signal), and the returned signal, and the cosine of the relative phase angle.

It should be noted, that since the interrogation and reply signals are derived from the same source, the relative phase of such signals is a function of the round trip distance between the interrogating unit and the remote unit. Such a phenomenon is the basis of many radar ranging systems, which compute the distance between interrogating and remote units from the relative phase of the signals. However, at various phase relationships, e.g. when the sample of the interrogation signal and reply signal are 90° out of phase, there is a null in the amplitude of the mixer output signal.

In a homodyne communication system, wherein the reply signal is modulated with signals bearing information, such amplitude nulls may cause serious errors in processing the information, such errors being termed herein as amplitude null errors. Specifically, in systems wherein the interrogating unit may be in relative motion with respect to the remote unit, various relative positions of the interrogating and remote units give rise to phase relationships causing such amplitude null errors, thereby introducing potential errors in or loss of the communicated information.

It will be appreciated that a drift in the frequency of the interrogation signal will cause the amplitude null producing relative positions to change, giving thereby the effect of a relative movement of the units.

SUMMARY OF THE INVENTION

The present invention is directed to a homodyne communication system of the type including an interrogating unit and at least one remote unit. The interrogating and remote units are adapted for relative movement therebetween. The interrogating unit includes means for transmitting an interrogation signal to the remote unit, means for receiving an information-bearing reply signal from the remote unit. The interrogating unit also includes phase detector means, receptive of first and second input signals respectively indicative of the interrogation signal and the reply signal, for generating an output signal indicative of the relative phase of the first and second input signals, and means to extract the information from the phase detector output signal.

The system further includes means, receptive of at least one of the first phase detector input signal and the reply signal, for selectively shifting the relative phase of the first and second phase detector input signals, whereby amplitude nulls in the phase detector output signal due to given phase relationships between said first and second phase detector input signals are substantially eliminated.

DETAILED DESCRIPTION OF THE PREFERRED EMBODIMENT

The present invention is directed to a homodyne communication system wherein the above mentioned amplitude null errors are reduced, if not substantially eliminated by creating what may be termed "phase diversity" between the interrogation and reply signals by selectively shifting the relative phase of the signals.

Figure 1:
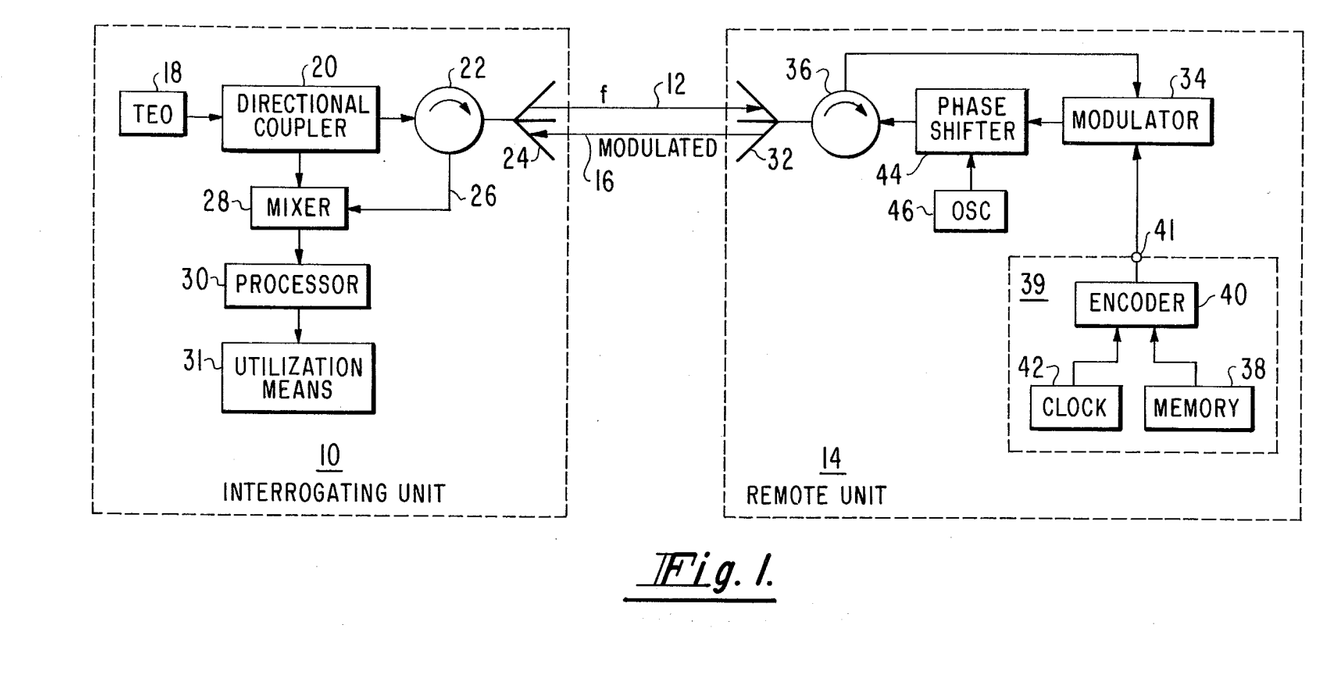
FIG. 1 is a block schematic of an embodiment of a homodyne communication system in accordance with the present invention.

A description of a homodyne communication system in accordance with the present invention is given with reference to FIG. 1. An interrogating unit 10, transmits a continuous-wave, unmodulated signal 12, serving as an interrogation signal to a remote unit 14. Remote unit 14 derives from transmitted signal 12 a modulated "return" or "reply" signal 16, which is radiated back to interrogating unit 10.

Interrogating unit 10 typically formed of conventional components includes a signal generating source, such as transverse electron oscillator (TEO) 18, a directional coupler 20, a circulator 22, an antenna network 24, a mixer 28 and a suitable signal processor 30. The output signal of TEO 18 is routed through directional coupler 20 and circulator 22 to antenna network 24. Antenna network 24, suitably a corporate network printed circuit array of the type described in U.S. Pat. No. 3,578,110, issued June 22, 1971 radiates transmitted signal 12 and is arranged also to receive modulated reply signal 16 from remote unit 14. The received reply signal 16 is applied by antenna network 24 to circulator 22 which directs the reply signal 16 over conductor 26 to mixer 28. Mixer 28 is also receptive of a sample of the output signals of TEO 18, tapped from TEO 18 by directional coupler 20. The output signals of mixer 28 are applied to processor 30, which will hereinafter be described in more detail in conjunction with FIG. 5. The output signals of processor 30 are applied to suitable utilization means 31, such as storage means or a display.

Remote unit 14 suitably formed of conventional components, comprises an antenna network 32, a modulator 34, a circulator 36, encoder logic, generally indicated as 39, a phase shifter 44 and an oscillator 46.

Antenna network 32, suitably a corporate network printed circuit antenna such as described in the aforementioned U.S. Pat. No. 3,587,110, receives the transmitted interrogation signal 12, routing it to a modulator 34, by a circulator 36. Modulator 34, is also receptive of an information code signal from output terminal 41 of encoder logic 39.

Encoder logic 39 comprises a suitable encoder 40, memory 38 and clock 42. Encoder 40 utilizes a shift register and mode control logic, (neither shown). The mode control logic typically comprises a counter. The shift register continually alternates, in response to the mode control, between loading (reading in) the contents of memory 38 and an output mode wherein the contents of the shift register are sequentially shifted out at a rate determined by clock 42. Such an encoder is particularly advantageous in that memory 38 may be implemented by merely connecting the respective bits of the shift register to an appropriate voltage source (e.g. to a voltage source or ground) in accordance with the information. Thus, the information to be transmitted is suitably stored in memory 38 and converted into binary signals, e.g. high or low voltage levels, indicative of the information, by encoder 40, at a bit rate in accordance with control signals from clock 42. The output signals from modulator 34 are passed through a suitable voltage controlled phase shifter 44 such as a varactor diode and therefrom through circulator 36 to antenna network 32. Phase shifter 44 is controlled by appropriate signals, as will be described, from a suitable source, such as oscillator 46. Antenna network 32 operates to radiate the modulated phase-shifted signal back to the interrogated unit 10 as reply signal 16.

In operation, TEO 18 in the interrogating unit 10 originates a continuous wave unmodulated signal at a predetermined frequency which is radiated by antenna network 24 as interrogation signal 12. Interrogation signal 12 impinges upon antenna network 32 of remote unit 14, and is coupled to modulator 34. Modulator 34 operates to impress coded information onto the applied signal, by any suitable technique such as amplitude or phase modulation. Where phase modulation is used, modulator 34 and phase shifter 44 can be combined into a single dual function unit as will be explained.

In accordance with one aspect of the present invention, oscillator 46 generates a square wave of a predetermined frequency, typically higher than the frequency of clock 42, thereby causing phase shifter 44 to shift alternately the phase of the return signal 16 by 0° and 90° at a periodic rate (hereinafter termed the "diversity" rate) greater than the bit rate of the information. Such periodic phase shifting will hereinafter be referred to as "phase diversity". It should be appreciated that the diversity rate may also, in some applications, be at a rate less than the bit rate. For example, in a system for slow moving vehicles, or in a system using an extremely high message rate (number of messages per second) the diversity rate may be made equal to or lower than the message rate. In addition, in other embodiments hereinafter described, the diversity rate may be determined by the occurrence of amplitude nulls in the output signal of mixer 28.

The modulated, diversity phase-shifted signal 16 is radiated to and received by interrogating unit 10, wherein it is mixed with a sample of the interrogation signal 12 in mixer 28 in accordance with well known homodyne principles. As noted above, the amplitude of the output signal of mixer 28 is equal to the product of the amplitudes of the interrogation signal sample and the reply signal and the cosine of the relative phase angle. This, in a conventional homodyne system, in those situations where the relative phase approaches 90°, as would be caused by the relative position of interrogating unit 10 and remote unit 14 at a given instant, an amplitude null will occur in the mixer (28) output signal. However, the phase diversity introduced into the reply signal 16 in a system in accordance with the present invention ensures that the relative phase of the reply and interrogation signals does not remain in the vicinity of 90° over the entire duration of any bit of information. Thus, the average magnitude of the amplitude over the duration of each bit of the output signal of mixer 28 will be substantially increased in those instances when the phase relationship due to the relative positioning of the interrogating and remote units would otherwise cause an amplitude null.

It is noted that the system of the present invention causes a reduction in the average amplitude of the output signal of mixer 28 in those instances where no such amplitude null producing phase relationships exist. However, whereas the increased amplitude accorded to the signals where amplitude null producing phase relationships exist by the phase diversity is determinative in the processing of such otherwise too-low amplitude signals, the reduction in amplitude of the signals where no null producing phase relationship exists does not substantially affect the processing of the information in those signals.

It should be appreciated that phase diversity according to this invention between the reply signal and the sample of the interrogation signal may be generated in the interrogating unit 10. In such a system circulator 36, phase shifter 44 and oscillator 46 are not required to be incorporated in remote unit 14. Antenna 32 would thus be connected directly to modulator 34. In the interrogating unit 10, phase shifter 44, driven by oscillator 46, is inserted between directional coupler 20 and mixer 28 or in the alternative between circulator 22 and mixer 28, to produce the desired phase diversity.

It should further be appreciated that phase shifter 44, connected as described in the interrogating unit 10, may be driven by a threshold detector (not shown) rather than by oscillator 46. The threshold detector would be arranged to detect amplitude nulls in the output signal of mixer 28, and accordingly cause phase shifter 44 to impart an additional relative phase shift, for example of 90° between the reply signal and the sample of the interrogation signal.

Moreover, it should be still further appreciated that phase diversity may be implemented in an arrangement in which neither the interrogating or remote unit incorporates phase shifter 44 and oscillator 46 by utilizing a separate intermediate unit, having a third antenna network (not shown) including a phase shifter 44 and oscillator 46. The intermediate unit would be situated in the communication path between the interrogating and remote units.

Figure 2:
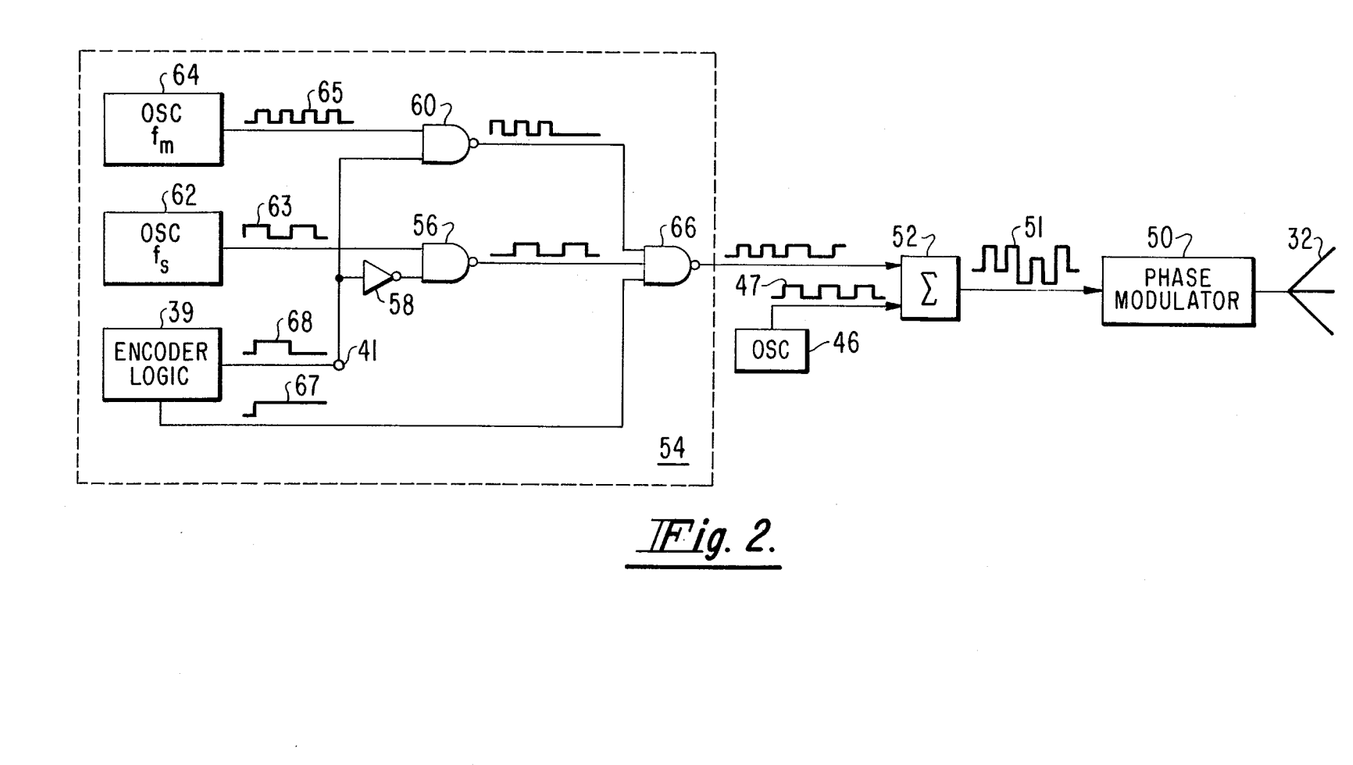
FIG. 2 is a block schematic of a remote unit of a preferred embodiment of the present invention.

FIG. 2 is a block schematic of a preferred embodiment of a remote unit utilizing phase modulation to impress frequency shift keying (FSK) signaling on the returned signal. In FSK signaling, tones of predetermined frequencies are respectively utilized to represent a logic one (mark frequency) and a logic zero (space frequency). Antenna network 32 is coupled to a conventional voltage-controlled phase modulator 50, suitably a varactor diode, which is driven by output signals 51 of a conventional two-input summer 52, such as described in "Electronic Analog and Hybrid Computers" by Korn and Korn; McGraw Hill, Inc., 1964, Chapter 1. Summer 52 has connected at one of its input terminals information logic 54. Information logic 54 includes encoder logic 39 corresponding to encoder logic 39 of FIG. 1. Output terminal 41 of encoder logic 39 is connected to one input of a two-input AND gate 60 and, through inverter 58, to one input of a second two-input NAND gate 56. The second input of NAND gates 56 and 60 are respectively connected to free-running oscillators 62 and 64, which generate tones 63 and 65 respectively at the predetermined space and mark frequencies. The amplitudes of space and mark frequency tones 63 and 65 are preferably chosen to create a 180° differential phase shift via phase modulator 50. The output terminals of NAND gates 56 and 60 are respectively connected to two of the input terminals of a three-input NAND gate 66. The third input terminal of NAND gate 66 receives a message enable signal 67 from encoder logic 39, typically taken from the mode control of the encoder as described in conjunction with encoder 40 in FIG. 1. The output terminal of NAND gate 66 is connected to summer 52. The other input terminal of summer 52 is connected to oscillator 46, applying a diversity tone 47. The frequency of diversity tone 47 is typically chosen such that it is greater than the bit rate of the information but less than the mark and space frequencies. The amplitude of the diversity tone 47 is preferably chosen to create a 90° phase shift via phase modulator 50.

In operation, encoder logic 39 generates a message comprising a sequence of binary code bits 68. Encoder logic 39 generates a logic one message enable signal 67 during the duration of the message, enabling NAND gate 66 only during the message. Message enable signal 67 is logic zero between messages thereby inhibiting NAND gate 66, and preventing erroneous information tones from being transmitted. It should be apparent that message enable signal 67 may also be used to inhibit the diversity oscillator 46 during the time between messages if desired. As previously noted, code bits 68 are generated in accordance with the information stored in memory 38 (FIG. 1) at a rate determined by clock 42 (FIG. 1). During the message, a low level code bit, representative of a zero, generated by encoder logic 39 enables NAND gate 56 with respect to the space frequency tone 63 and inhibits NAND gate 60 with respect to the mark frequency tone 65. NAND gate 60 provides a high level signal to NAND gate 66 which is also receptive during the message of a high level message enable signal 67, and thus enables NAND gate 66 with respect to space frequency tone 63, provided through NAND gate 56. Thus, during the logic zero value information bit, a space frequency tone is applied by information logic 54 to summer 52 wherein it is summed with diversity tone 47 from oscillator 46 and utilized to drive voltage-controlled phase modulator 50.

Similarly, during the message sequence, a logic one bit from decoder logic 39, representative of a one inhibits NAND gate 56 with respect to the space frequency tone 63 and enables NAND gate 60 with respect to the mark frequency tone 65. Thus, for an information bit of value ONE, a mark frequency tone is applied by information logic 54 to summer 52, wherein it is summed with the diversity tone 47 from oscillator 46 and utilized to drive voltage-controlled phase modulator 50.

Figure 3:
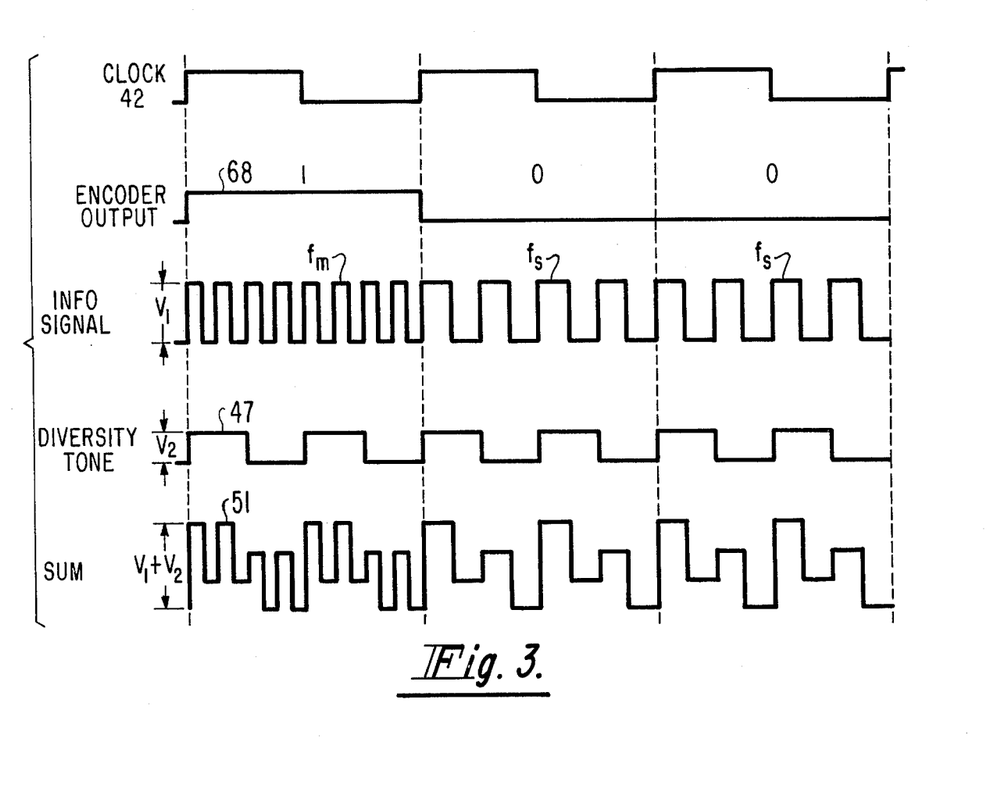
FIG. 3 is a diagram of the waveforms of various signals associated with the operation of the remote unit of FIG. 2.
Figure 4:
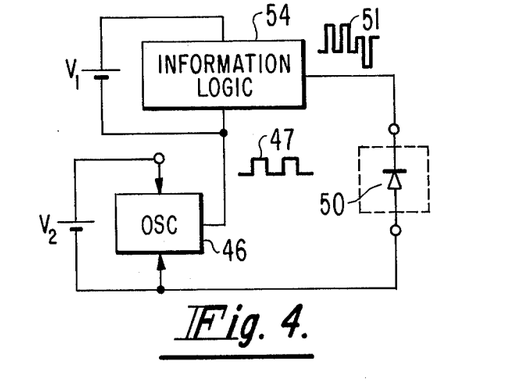
FIG. 4 is a block schematic of the interconnection of the information and diversity logic with the phase modulator of FIG. 2, arranged to eliminate the separate summer component.

A diagram of the above-mentioned waveforms is shown in FIG. 3 for a 3-bit sequence 1, 0, 0. The phase modulator 50 varies the phase of the return signal in accordance with the amplitude of the sum signal 51 from summer 52. In practice, the summation of information and diversity tones can be effected without the use of a physical summer element. Such a configuration is shown in FIG. 4. The cathode and anode of the varactor diode phase modulator 50 are respectively connected to the output terminal of information logic 54 and the ground of diversity oscillator 46. The diversity tone is applied to the collective ground reference of the information logic 54. The voltage across varactor 50 thus produced is the equivalent of the sum voltage 51 shown in FIG. 3.

Referring again to FIG. 3, the mark (65) and space frequency (63) components of sum signal 51 have such amplitudes as to cause the phase of the return signal 16 to be shifted alternately for example, by 0° and 180° at a periodic rate equal to their respective frequencies. The amplitude of the output signal of the mixer 28 in the interrogating unit 10 (FIG. 1) will respond to the phase modulation and thus, in effect, reproduce the mark and space frequency tones. The diversity phase shifting will affect the maximum amplitude of the reproduced tones, as described above, but does not interfere with accurate reproduction of the respective mark and space frequencies in the mixer (28) output signal. The presence of a mark or space frequency tone during a given bit is detected by processor 30, thereby ascertaining the value of the bit.

Figure 5:
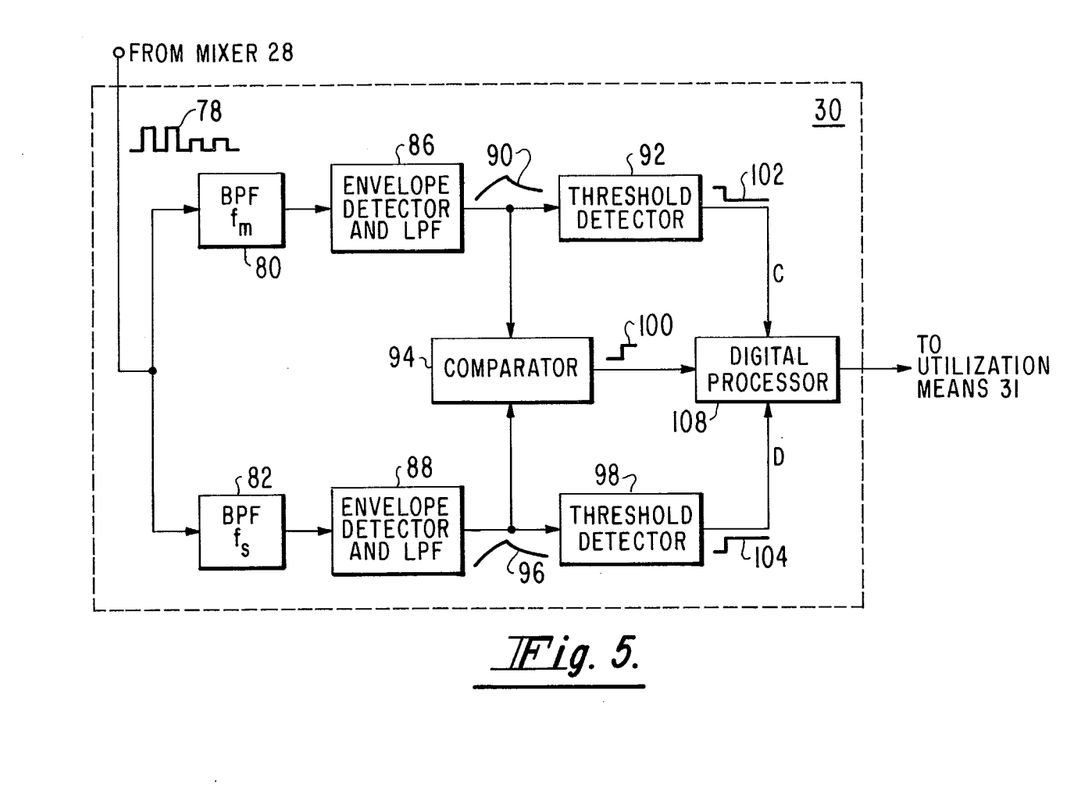
FIG. 5 is a block schematic of a signal processor utilized in an interrogating unit in a preferred embodiment of the present invention.
Figure 6:
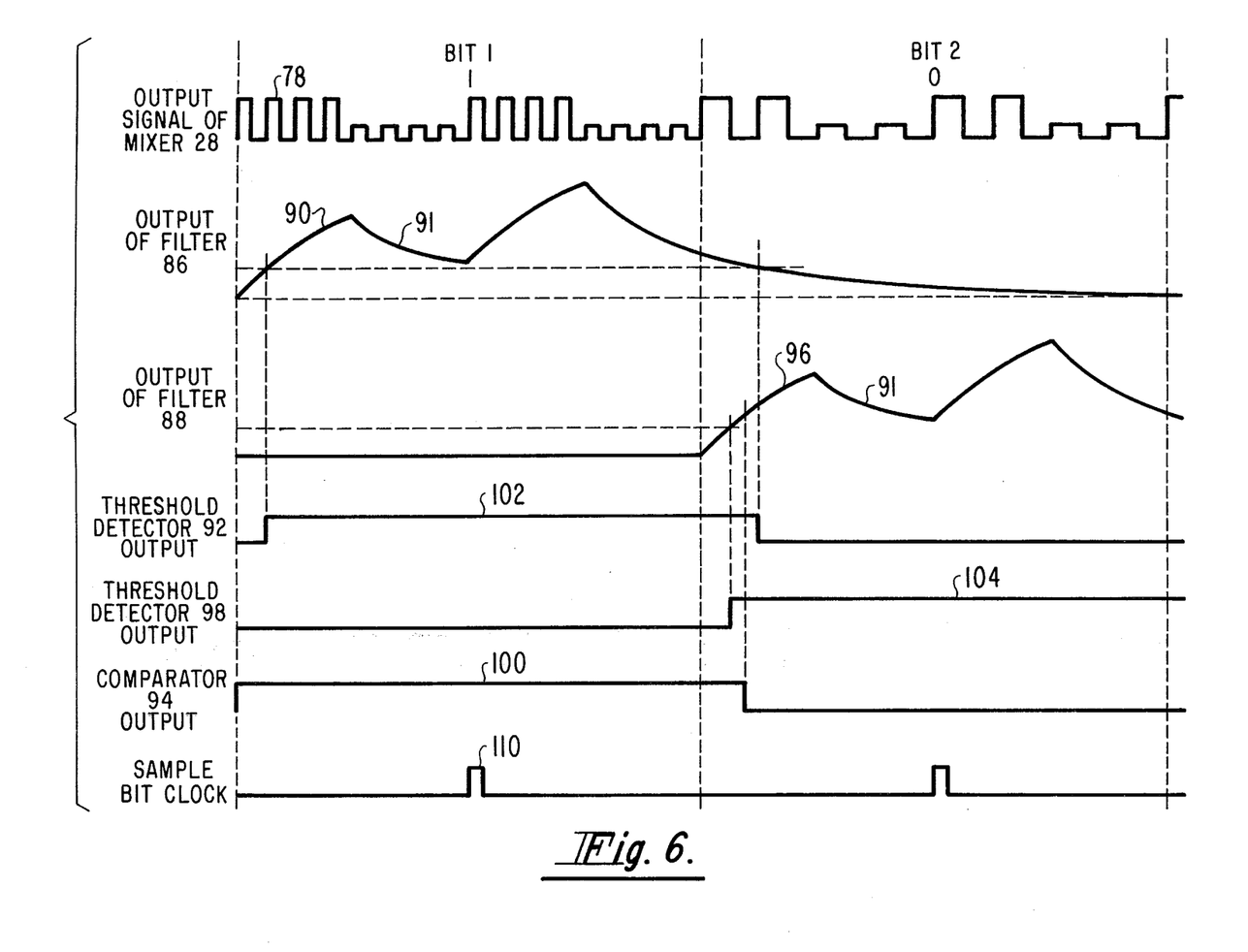
FIG. 6 is a diagram of waveforms of various signals associated with the operation of the signal processor of FIG. 5.

Referring to FIG. 5, there is shown a suitable processor 30 for use in conjunction with the (FSK) remote unit of FIG. 2. The output signal from mixer 28, represented by waveform 78, is applied to first and second channels, respectively, associated with the mark and space frequencies. Mixer output signal 78 can be, if desired, amplified prior to application to the first and second channels. Specifically, mixer output signal 78 is applied to bandpass filters 80 and 82, which are respectively center-tuned to the mark and space frequencies. The output signals of bandpass filters 80 and 82 are respectively applied to envelope detector and low pass filters 86 and 88. Envelope detector and low pass filters 86 and 88 suitably each comprise a diode detector in combination with a low-pass resistor-capacitor filter circuit. The values of resistors and capacitors are chosen to provide predetermined rise and fall time constants. Output signal 90 of envelope detector and low pass filter 86 is applied to a suitable threshold detector 92 and comparator 94. Similarly, the output signal 96 of envelope detector and low pass filter 88 is applied to comparator 94 and threshold detector 98. The output signal 100 of comparator 94, output signal 102 of threshold detector 92 and output signal 104 of threshold detector 98 are all applied as respective input signals to a suitable logic, generally referred to as digital processor 108, to sample and perform threshold and parity tests on the information contained in signal 100. The output signals of digital processor 108 are applied to utilization means 31 (FIG. 1). The operation of processor 30 will be now explained with reference to FIGS. 5 and 6. FIG. 6 illustrates the waveforms and relative timing of the signals associated with processor 30 during two bits of signal 78, respectively of value 1 and value 0, for such a relative displacement between interrogating and remote units that, absent a diversity phase shift, amplitude null errors would result. The diversity rate as shown in FIG. 6 is approximately twice that of the bit rate, with the mark and space frequencies being in the order of two to five times the diversity rate described above. Such relationships between the frequencies are illustrative only and are shown thus for purposes of simplicity. A system embodying the arrangement shown in FIG. 5 has been implemented with a data rate of 400 bits per second, the diversity rate in the order of 1700 Hz and mark and space frequencies respectively at 60 and 50 KHz.

Output signals 78 from mixer 28 are selectively passed by bandpass filters 80 and 82 in accordance with the frequency of the tone present in signal 78. Bandpass filter 80 passes to envelope detector 86 only those bits containing a mark frequency tone (logic one). Similarly bandpass filter 82 passes to envelope detector and low pass filter 88 only bits containing a space frequency tone (logic zero). Envelope detector and low pass filters 86 and 88 operate to detect the envelope of the signals respectively passed by bandpass filters 80 and 82 and to, in effect, average the amplitude of the signals over the duration of the respective bits by use of appropriate time constants in the low pass filter. It is to be noted that the variations 91 in signals 90 and 96 are exaggerated as compared to actual variations occurring in practice by the relative diversity and bit rates illustrated. Comparator 94, compares the output signal 90 from envelope detector and low pass filter 86 with the simultaneous value of the output signal 96 of envelope detector and low pass filter 88. Where the value of signal 90 is greater than the simultaneously occurring value of signal 96, thus indicative of a mark signal during the bit, comparator 94 generates a high level output signal 100 indicative of a one. Conversely, where the value of signal 96 is greater than the simultaneously occurring value of signal 90, indicative of a space frequency signal during the bit, comparator 94 generates a low level output signal 100 indicative of a zero. Digital processor 108, in response to an internally generated sampling clock signal 110, (i.e. a clock signal generated within digital processor 108), samples the comparator output signal 100. Sampling clock signal 110 is initiated when the first bit of the message exceeds a preset threshold. The first pulse of clock signal 110 suitably occurs a predetermined period after the threshold level is reached. Thereafter, pulses occur with repetition rate substantially equal to the bit rate. Threshold detectors 92 and 98 provide threshold information signals 102 and 104 to digital processor 108 both to initiate the sampling clock signal and to test the validity of the sampled information. Parity checks may also be implemented to test the validity of the information. Digital processor 108 performs such sampling and threshold and parity checks, and provides a signal indicative of the information to utilization means 31. A more detailed description and analysis of signal processor 30 may be found in IEEE Transactions on Vehicular Technology, May 1971, Vol. VT-20, No. 2, page 26 "Analysis of an Electronic Fence Element for a Vehicle Location System" by G. S. Kaplan.

It should be appreciated that in accordance with the present invention particularly advantageous communication systems may be provided by utilizing homodyne detection wherein signal amplitude nulls due to the relative position of the interrogating and remote units are substantially eliminated by creating phase diversity in the return signal by alternately shifting at a given rate the phase of the return signal by a first and a second predetermined angle, e.g. 0° and 90°.

As application of such a communication system will now be described in the environment of an automatic vehicle location system.

AUTOMATIC VEHICLE LOCATION SYSTEM

An automatic vehicle location system utilizing the above-described homodyne FSK signaling system may be implemented by mounting the interrogating unit 10 on or in a vehicle and respectively mounting remote units 14, for example as sign posts, at respective predetermined roadside locations. A vehicle, coming into range of a signpost, interrogates the signpost, which returns a message indicative of its respective location. The location message, as provided at the output of signal processor 30 may be entered into suitable storage means in utilization means 31, and, via a cooperating two-way radio, transmitted, for example, upon interrogation of the vehicle from a central location, to the central location. Furthermore, utilization means 31 may be arranged to retain a predetermined number of messages in a time ordered basis such that the sequence of messages are indicative of the direction of travel of the vehicle.

Figure 7:
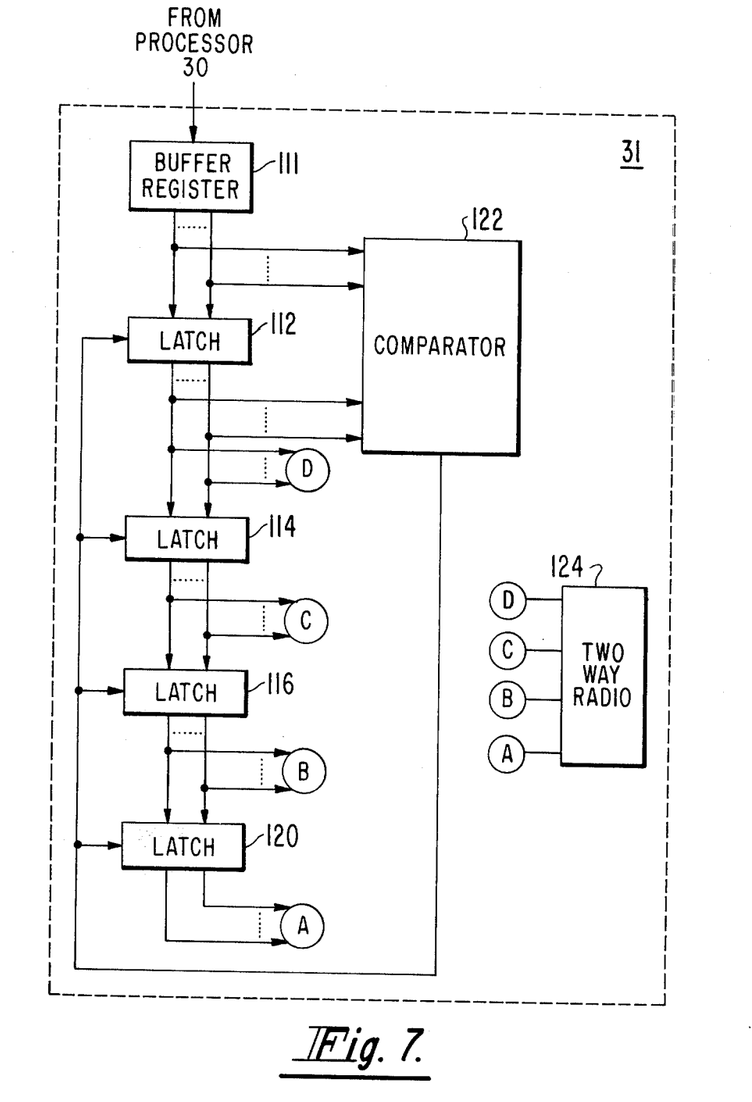
FIG. 7 is a block schematic of utilization means adapted for use of the invention in an automatic vehicle monitoring system.

Such utilization means 31 are illustrated in FIG. 7. Output signals from processor 30 (FIG. 1 or FIG. 5) are applied to a suitable buffer register 111 which is in turn connected, on a bit by bit basis, to a first latch 112 of a series of conventional latches, such as RCA CMOS circuit CP 4035, 112, 114, 116 and 120, each latch being connected on a bit by bit basis to the next succeeding latch in the sequence. The contents of buffer register 111 and first latch 112 are also applied to a conventional comparator 122, the output signals of which are in turn applied as control signals to the respective latches 112–120. Suitable delays (not shown)

can be inserted in the control signal path between the respective latches 112–120, to ensure a proper timing sequence. The contents of the respective latches 112–120 are also applied to a suitable two-way radio 124, via connections A, B, C and D.

In operation, location information received from a signpost, as ascertained by processor 30, is sequentially loaded to buffer register 111. Comparator 122 then compares the contents of buffer register 111 with the contents of first latch 112. If the respective contents are not equal, comparator 122 generates a load command, causing each successive latch 114–120 to be respectively loaded with the contents of the respective preceding latch 112–116 and latch 112 to be loaded with the contents of buffer register 111. When the contents of latch 116 are loaded into latch 120 the prior contents of latch 120 are destroyed or erased. Where the contents of buffer register 111 and latch 112 are equal, the latches retain their respective prior contents. Such a procedure is initiated with each new valid message received by interrogating unit 10 (FIG. 1). Thus, the sequence of latches 112–120 retain in memory the last four locations passed by the interrogating vehicle, in a time ordered sequence indicative of the direction of travel of the interrogating vehicle. It should be noted that any number of latches may be used in the sequence. Two-way radio 124, typically upon interrogation from a central location, receives the contents of the respective latches 112—120 transmits them in sequence, in addition to a vehicle identification number, if desired, to the central location. The central location can thus ascertain the instantaneous location and the direction of travel of the vehicle. It should be noted that transmission to the central location can be maintained on a continual basis, for example during a high speed chase, thus to monitor continuously the location of the vehicle.

It will be understood that the above description is an illustrative embodiment of the present invention, and that the invention is not limited to the specific form shown. Modifications may be made in the design and arrangement of the elements without departing from the spirit of the invention as will be apparent to those skilled in the art.

Thus an FSK system using the homodyne principle as illustrated in FIG. 2 embodying the present invention may be implemented without the phase diversity feature by eliminating the oscillator 46 and summer 52. In environments where the nulling problem exists, the phase diversity feature may be incorporated on a continuous or selectively controlled basis.

What is claimed is:

1. A homodyne communication system of the type including an interrogating unit and at least one remote unit, and wherein said interrogating unit includes means for transmitting an interrogation signal to said remote unit, means for receiving an information-bearing reply signal from said remote unit, phase detector means, receptive of first and second input signals respectively indicative of said interrogation signal and said reply signal, for generating an output signal indicative of the relative phase of said first and second input signals, and means to extract said information from said phase detector output signal; wherein the improvement comprises:

means, receptive of at least one of said first phase detector input signal, said interrogation signal, and said reply signal, for selectively shifting said relative phase of said first and second phase detector input signals by a predetermined angle whereby errors and loss of information caused by amplitude nulls in said phase detector output signal at certain relative phase relationships between said first and second phase detector input signals are substantially eliminated.

2. A homodyne system comprising an interrogating unit and at least one remote unit for communicating information to said interrogating unit from said remote unit;

said interrogating unit including;
a transmitter for transmitting a signal of a predetermined frequency to said remote unit,
a receiver for receiving an information-bearing return signal from said remote unit, said return signal bearing the information at a given bit rate,
mixer means, receptive of a sample of said transmitted signal and said return signal, for generating an output signal representative of phase differences therebetween, and
signal processor means, receptive of said mixer output signal, for extracting said information from said return signal;

said remote unit including;
an antenna network, responsive to said transmitted signal, for producing an antenna output signal representative of said transmitted signal, and for radiating said return signal,
means, coupled to said antenna network and receptive of a signal representative of said information, for modulating said antenna output signal in accordance with said information, and
means, coupled to said antenna network, for shifting at a given rate the phase of said antenna output signal alternately by a first and a second predetermined angle,
said phase-varied modulated antenna output signal being applied to said antenna network and radiated by said antenna network as said return signal, whereby said return signal is modulated in accordance with said information and is phase shifted at said given rate, thereby substantially eliminating errors and loss of said information due to amplitude nulls in said mixer output signal at given relative phase relationships between said sample of said transmitted signals.

3. The system of claim 2 wherein said means for alternately phase shifting said antenna output signal comprises means to shift the phase of said antenna output signal alternately by 0° and 90°.

4. The system of claim 2 wherein said means for modulating said antenna output signal in accordance with said information is an amplitude modulator.

5. The system of claim 2 wherein said means for modulating said antenna output signal in accordance with said information is a phase modulator.

6. The system of claim 5 wherein said means for modulating said antenna output signal and said means for alternately phase shifting said antenna output signal comprise a voltage-controlled phase shifter, said phase shifter being receptive of and responsive to a signal representative of the sum of the amplitudes of said signal representative of said information and a signal representative of said alternate phase shifting.

7. The system of claim 5 wherein said remote unit further includes means for generating an FSK signal comprising bits of mark frequency signals and space frequency signals, said mark and space frequencies being respectively indicative of predetermined values of said information, said FSK signal having a given bit rate, and being applied to said phase modulator as said signal representative of said information.

8. The system of claim 7 wherein said means for alternately phase shifting said antenna output signal comprises means for periodically shifting the phase of said antenna output signal alternately by a first and a second predetermined angle at a rate less than said mark and space frequency but greater than said bit rate.

9. The system of claim 2 wherein:
said information has a predetermined bit rate; and
said means for alternately phase shifting said antenna output signal comprises means for periodically shifting the phase of said antenna output signal alternately by a first and a second predetermined angle at a rate greater than said bit rate.

10. The system of claim 2 wherein said information forms messages at a predetermined message rate; and
said means for alternately phase shifting said antenna output signal comprises means for periodically shifting the phase of said antenna output signal alternately by a first and a second predetermined angle at a rate less than said message rate.

11. The homodyne system of claim 2 adapted for use as a vehicle location system wherein said interrogating unit is mounted on a vehicle and a plurality of said remote units are respectively mounted at predetermined locations, said information being communicated to said vehicle from a respective one of said remote units as the vehicle passes the respective location, said information being a message indicative of said respective location, the system further including:
storage means in said vehicle for retaining in storage a predetermined number of messages; and
means responsive to command signals from a central location for communicating the information in said stored messages to said central location.

12. The system of claim 11 wherein said storage means in said vehicle comprises:
means for retaining in storage said predetermined number of messages in a time-ordered sequence; and
means for erasing the earliest received of said predetermined number of messages in response to the receipt of the next subsequent message and for entering said next subsequent message into storage whereby only the last-received predetermined number of messages are retained in storage, the sequence of said messages being indicative of the direction of travel of the vehicle.

13. A homodyne system comprising an interrogating unit and at least one remote unit for communicating information to said interrogating unit from said remote unit;
said interrogating unit including;
a transmitter for transmitting an interrogation signal of a predetermined frequency to said remote unit,
a receiver for receiving an information-bearing return signal from said remote unit, said return signal bearing the information at a predetermined bit rate,
phase detector means, receptive of a sample of said interrogation signal and said return signal, for generating an output signal representative of phase differences therebetween, and signal processor means, receptive of said phase detector output signal, for extracting the information from said return signal;
said remote unit including;
an antenna network, responsive to said interrogation signal, for producing an antenna output signal representative of said interrogation signal, and for radiating said return signal,
an encoder for generating a binary output signal representative of said information, said binary signal having said predetermined bit rate,
gating means, responsive to said encoder output signal and receptive of a signal having a first predetermined frequency and a signal having a second predetermined frequency, for producing an output signal comprising bits of said first and second predetermined frequencies in accordance with respective corresponding bits of said encoder output signal, and
voltage-controlled phase shifting means, coupled to said antenna network and responsive to said gating means output signal, for modulating the phase of said antenna output signal in accordance with said gating means output signal,
said phase modulated antenna output signal being applied to said antenna network and radiated by said antenna network as said return signal;
whereby said phase detector means output signal in said interrogating unit is representative of said gating means output signal and said processor extracts said information by detecting the respective presence of said first and second predetermined frequencies in said phase detector means output signal.

14. The system of claim 13 further including oscillator means, coupled to said phase shifting means, for generating a signal at a third predetermined frequency, thereby providing periodic phase shifting of said return signal to substantially eliminate errors and loss of said information amplitude nulls in said phase detector output signal at given relative phase relationships between said transmitted and return signals.

15. In a homodyne system of the type including an interrogating unit and at least one remote unit for communicating information to said interrogating unit from said remote unit; wherein said interrogating unit includes a transmitter for transmitting a signal of a predetermined frequency to said remote unit, a receiver for receiving an information-bearing return signal from said remote unit, said return signal bearing the information at a given bit rate, mixer means, receptive of a sample of said transmitted signal and said return signal, for generating an output signal representative of phase differences therebetween, and signal processor means, receptive of said mixer output signal, for extracting the information from said return signal;
an improved remote unit comprising;
an antenna network, responsive to said transmitted signal, for producing an antenna output signal representative of said transmitted signal, and for radiating said return signal,
means, coupled to said antenna network and receptive of a signal representative of said information, for modulating said antenna output signal in accordance with said information, and
means, coupled to said antenna network for shifting at a given rate the phase of said antenna output signal alternately by a first and a second predetermined angle, said phase-varied modulated antenna output signal being applied to said antenna network and radiated by said antenna network as said return signal, whereby said return signal is modulated in accordance with said information and is phase shifted at said given rate, whereby errors and loss of information due to amplitude nulls in said mixer output signal at given relative phase relationships between said sample of said transmitted signal and said return signal are substantially eliminated.

16. In a homodyne system of the type including an interrogating unit and at least one remote unit for communicating information to said interrogating unit from said remote unit; wherein said interrogating unit includes; a transmitter for transmitting a signal of a predetermined frequency to said remote unit, a receiver for receiving an information-bearing return signal from said remote unit, said return bearing the information at a predetermined bit rate, phase detector means, receptive of a sample of said transmitted signal and said return signal, for generating an output signal representative of phase differences therebetween, and signal processor means, receptive of said phase detector output signal, for extracting the information from said return signal;

an improved remote unit comprising:

an antenna network, responsive to said transmitted signal, for producing an antenna output signal representative of said transmitted signal, and for radiating said return signal, an encoder for generating a binary output signal representative of said information, said binary signal having said predetermined bit rate, gating means, responsive to said encoder output signal and receptive of a signal having a first predetermined frequency and a signal having a second predetermined frequency, for producing an output signal comprising bits of said first and second predetermined frequencies in accordance with respective corresponding bits said encoder output signal, and voltage-controlled phase shifting means, coupled to said antenna network and responsive to said gating means output signal, for modulating the phase of said antenna output signal in accordance with said gating means output signal, said phase modulated antenna output signal being applied to said antenna network and radiated by said antenna network as said return signal;

whereby said phase detector means output signal in said interrogating unit is representative of said gating means output signal and said processor extracts said information by detecting the respective presence of said first and second predetermined frequencies in said phase detector means output signal.

17. The improved remote unit claim 16 further including: oscillator means, coupled to said phase shifting means, for generating a signal at a third predetermined frequency, thereby providing periodic phase shifting of said return signal to substantially eliminate errors and loss of said information due to amplitude nulls in said phase detector output signal at given relative phase relationships between said transmitted and return signals.

* * * * *